United States Patent
Yamada

(10) Patent No.: US 6,713,900 B2
(45) Date of Patent: Mar. 30, 2004

(54) LINEAR MOTORS AND STAGES COMPRISING SAME THAT PRODUCE REDUCED MAGNETIC FIELDS AT AN OPTICAL AXIS FOR CHARGED-PARTICLE-BEAM LITHOGRAPHY

(75) Inventor: Atsushi Yamada, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/947,255

(22) Filed: Sep. 5, 2001

(65) Prior Publication Data

US 2002/0047321 A1 Apr. 25, 2002

(51) Int. Cl.[7] .......................... H02K 41/00; H02K 41/02
(52) U.S. Cl. ........................ 310/12; 318/135; 355/53; 355/72
(58) Field of Search .................. 310/12; 318/135, 318/574; 355/53, 72

(56) References Cited

U.S. PATENT DOCUMENTS 5,008,578 A * 4/1991 Pace .......................... 310/256
5,565,718 A * 10/1996 Takei .......................... 310/12
6,274,953 B1 * 8/2001 Hwang et al. ................. 310/12
6,441,514 B1 * 8/2002 Markle ........................ 310/12

* cited by examiner

Primary Examiner—Nicholas Ponomarenko
Assistant Examiner—Judson H. Jones
(74) Attorney, Agent, or Firm—Klarquist Sparkman, LLP

(57) ABSTRACT

Stages are disclosed for holding, e.g., a reticle or substrate while performing charged-particle-beam (CPB) lithography involving the reticle or substrate. The subject stages include at least one linear motor and exhibit reduced adverse effects at an optical axis of magnetic fields generated by the linear motor(s). In one configuration, a stage-driving permanent magnet is split into two magnet subunits that are situated equidistantly from the optical axis. This configuration allows each of the subunits to be situated farther from the optical axis than the single magnet used in a conventional stage. Because the magnitude of a magnetic field generated by a permanent magnet generally is inversely proportional to the square of the distance from the permanent magnet, increasing the distance of the magnet from the optical axis reduces the magnitude of the magnetic field, generated by the permanent magnet, at the optical axis. Various symmetrical configurations of magnet subunits, and of magnet subunits with associated dummy permanent magnets are disclosed.

20 Claims, 6 Drawing Sheets

LINEAR MOTORS AND STAGES COMPRISING SAME THAT PRODUCE REDUCED MAGNETIC FIELDS AT AN OPTICAL AXIS FOR CHARGED-PARTICLE-BEAM LITHOGRAPHY

FIELD

This disclosure pertains to stages and the like as used in charged-particle-beam (CPB) lithographic-exposure systems such as "direct-drawing" and "projection" exposure systems. CPB direct-drawing systems are used mainly for, e.g., manufacturing masks and reticles as used in optical and CPB microlithography apparatus and methods. CPB projection exposure systems are any of various CPB microlithography apparatus used principally in the manufacture of microelectronic devices such as integrated circuits, displays, thin-film magnetic heads, and micromachines.

BACKGROUND

Charged-particle-beam (CPB) direct-drawing lithography systems literally draw a pattern using a charged particle beam such as an electron beam. These systems, and their associated methods, are used mainly for drawing a pattern to be defined on a mask or reticle (generally termed a "reticle" herein). CPB projection-lithography systems project an image of a pattern, defined on a reticle, onto a substrate (e.g., semiconductor wafer) that has been "sensitized" so as to be imprintable with the image. In both general types of lithography systems, one or more stages are used to hold and controllably move the substrate and, if one is used, the reticle. Specifically (e.g., in a CPB projection-lithography system), a "reticle stage" supports and moves a reticle, and a "wafer stage" supports and moves a substrate. Each such stage is generally termed a "stage."

Various approaches have been considered for driving a stage. In a conventional CPB direct-drawing system, a common approach involves driving the stage using a motor connected to the stage using a mechanical power-transfer mechanism such as a ball screw for transforming rotational motion of the motor into linear motion of the stage. Unfortunately, power-transfer mechanisms such as ball screws capable of achieving finely controlled motion of the stage actually are quite complex and disadvantageously generate fine dust particles that contaminate the reticle or substrate held by the stage.

To counter the problem posed by motors and ball screws, the use of gas-based actuators, such as air cylinders, has been proposed. Modern CPB lithographic-exposure systems, however, must be capable of accurately transferring pattern elements that are only 100 nm wide or less, with satisfactorily high throughput, operating speed, and accuracy of establishing and maintaining stage position. Gas-based actuators simply are incapable of meeting these requirements.

In response to the need for better stage actuators, actuators based on linear motors have come recently into use. Linear motors that contain permanent magnets, however, have a problem in that the charged particle beam is adversely affected by the magnetic field generated by the permanent magnets. If the lithography system is to be used for forming a 100-nm linewidth pattern on a wafer or other substrate at high throughput, the effects of the magnetic field generated by the permanent magnets in the linear motor cannot be ignored.

Two types of linear motors are in current use. In a moving-coil (MC) linear motor, the permanent magnet is provided on the "stator" side, and a coil is provided on the "armature" or "moving member" side. In a moving-magnet (MM) linear motor, the permanent magnet is provided on the moving member side, and a coil is provided on the stator side.

Of these two types of linear motors, in the MC type, the magnetic field created by the permanent magnet remains constant. During an actual lithographic exposure, no current flows in the coil. The coil either does not generate a magnetic field, or generates a magnetic field that is exceedingly small compared with the magnetic field generated by the permanent magnet. Hence, it is relatively simple to compensate for the effects on a CPB optical system of the magnetic field generated by the linear motor. Nevertheless, to facilitate compensation, it is desirable to reduce the magnetic field generated by the linear motor, especially in the vicinity of the optical axis of the CPB optical system.

MC-type linear motors also are disadvantageous because the coils (which generate heat during operation and require cooling) are difficult to cool. I.e., a coil located on a moving component requires that the coolant be supplied to the coil via a flexible conduit. The necessary flexibility of the conduit results in unstable positional control of the linear motor. For these reasons, it more desirable to use an MM-type linear motor for stage movement.

MM-type linear motors have a drawback in that the magnetic field generated by the permanent magnet, as experienced at the optical axis, changes with movement of the stage. This change in the magnetic field can cause problems with controlling the charged particle beam propagating through the CPB optical system. Correcting this problem at the CPB optical system requires a changing magnitude of correction, depending upon stage position, which is essentially impossible to accomplish.

SUMMARY

In view of the shortcomings of conventional apparatus and methods as summarized above, an object of the present claims is to provide a stage for a charged-particle-beam CPB exposure system, wherein any impact of the magnetic field generated by a stage-driving linear motor on the CPB optical system is minimized.

To such end, stage assemblies are provided for CPB lithographic-exposure systems. An embodiment of such an assembly comprises a stage configured for holding a reticle or substrate. The stage extends in an X-Y plane perpendicular to an optical axis that is parallel to a Z axis. The assembly also includes a linear motor operatively coupled to the stage and configured for moving the stage in the X-Y plane. The linear motor comprises a permanent magnet split into multiple permanent-magnet subunits arranged symmetrically with respect to a plane that is perpendicular to the X-Y plane. The linear motor can be a moving-coil type or moving-magnet type of linear motor. Also, the first and a second permanent-magnet subunits produce respective first and second magnetic fields that desirably cancel at least a portion of each other at the optical axis.

By splitting the permanent magnet into two or more subunits, each subunit can be disposed farther from the optical axis (i.e., laterally farther from the CPB optical system) than the permanent magnet in a conventional linear motor in a stage assembly. Such a configuration minimizes the impact of the magnetic field generated by the subunits CPB optical system.

A stage assembly according to another embodiment comprises a stage as summarized above. The stage assembly also includes a moving-coil type of linear motor operatively coupled to the stage. The linear motor comprises first and second linear-motor portions that are disposed in respective positions that are symmetric with respect to a plane including the optical axis and extending perpendicularly to the X-Y plane and parallel to the movement direction of the stage. Each linear-motor portion comprises a respective permanent magnet split into multiple respective magnet subunits, wherein the magnet subunits of the first linear-motor portion are disposed relative to the magnet subunits of the second linear-motor portion in a point-symmetrical manner with respect to a point at which the X-Y plane intersects the optical axis.

I.e., in a 3-dimensional rectangular coordinate system in which the optical axis is designated as the Z-axis, if the central axis for a linear motor is on the X-Y plane and the linear motor drives the stage in the Y-direction, then the linear-motor portions are disposed in positions that are plane-symmetrical with respect to the Y-Z plane that passes through the optical axis. Because the respective permanent magnets of each linear-motor portion are each split into two or more respective magnet subunits, the magnet subunits of a first linear-motor portion are disposed with respect to the magnet subunits of a second linear-motor portion so as to be point-symmetrical relative to the point (i.e., the origin) at which the X-Y plane containing the respective central axes for the linear-motor portions intersects with the optical axis.

In other words, the permanent magnet in the first linear-motor portion and the corresponding permanent magnet in the other linear-motor portion are disposed point-symmetrically with respect to the origin. In this arrangement, on the optical axis, a magnetic field in any direction in 3-dimensional space assumes a substantially zero magnitude due to the cancellation of the magnetic fields associated with the coils of the linear-motor portions. Thus, the impact of the magnetic field, generated by the magnet subunits in the linear-motor portions, on the CPB optical system is minimized.

A stage assembly according to yet another embodiment comprises a stage as summarized above. The stage assembly also includes a moving-magnet type of linear motor operatively coupled to the stage for moving and positioning the stage in a movement direction in the X-Y plane. The linear motor comprises multiple permanent-magnet subunits and multiple corresponding dummy permanent-magnet subunits. The magnet subunits and the dummy-magnet subunits are arranged so as to move symmetrically with respect to a plane that is perpendicular to the movement direction and that includes the optical axis. Each of the permanent-magnet subunits and the dummy permanent-magnet subunits has respective magnetic poles. In this embodiment, if the Z-axis is perpendicular to the X-Y plane, the optical axis is parallel to the Z-axis, and the movement direction of the stage is the Y-axis direction, then the plane that is perpendicular to the movement direction and that includes the optical axis is an X-Z plane. In this configuration the respective magnetic fluxes from each permanent magnet subunit that moves the stage and from the respective dummy permanent magnet corresponding to the particular permanent magnet subunit cancel each other on the X-Z plane. As a result, even if the permanent magnet subunit moves in the movement direction, the magnetic flux from the permanent magnet subunit as experienced on the optical axis is substantially zero. A key benefit of this configuration is that the magnetic fields produced by the permanent magnets used to drive the stage have substantially no effect on the charged particle beam propagating in an axial direction through the CPB optical system.

As an alternative to the configuration summarized in the preceding paragraph, the respective magnetic poles of the permanent magnet subunits and of the dummy-magnet subunits can be disposed symmetrically with respect to the plane that is perpendicular to the movement direction and that includes the optical axis.

The following is further with respect to the "plane that is perpendicular to the movement direction and that includes the optical axis." By way of example, if the stage is driven in the Y-axis direction, and if the magnetic poles for one of the permanent magnets that move the stage in the Y-axis direction are oriented (toward the positive Y-axis direction) with N-S-N-S . . . poles on the top and S-N-S-N . . . poles on the bottom, then the magnetic poles for the corresponding dummy permanent magnet are oriented (toward the negative Y-axis direction) with N-S-N-S . . . poles on the top and S-N-S-N . . . poles on the bottom. Such an arrangement of magnetic poles allows the respective magnetic fluxes (in the movement direction) between each stage-moving permanent magnet and its corresponding dummy permanent magnet to cancel each other, and thus to produce a substantially zero-magnitude magnetic flux at the optical axis. Even if the permanent-magnet subunit moves, the effect of the magnetic field (in the movement direction) generated by the permanent-magnet subunit on the CPB optical system is extremely small.

Alternatively, the respective magnetic poles of the stage-moving magnet subunits and of the dummy-magnet subunits can be disposed anti-symmetrically with respect to the plane that is perpendicular to the movement direction and that includes the optical axis. In this alternative configuration, the "plane that is perpendicular to the movement direction and that includes the optical axis" is the same as summarized above. The term "anti-symmetrically" means that the respective magnetic poles for each of the stage-moving magnet units and their respective dummy-magnet subunits are in mutually symmetrical positions, but each respective dummy-magnet subunit is rotated 180 degrees around the center line of its movement direction. For example, for moving the stage in the Y-axis direction, the magnetic poles for each permanent-magnet subunit are oriented in the positive Y-axis direction as N-S-N-S . . . on the top and S-N-S-N . . . on the bottom, and the magnetic poles for each respective dummy-magnet unit are oriented in the negative Y-axis direction as S-N-S-N . . . on the top and N-S-N-S . . . on the bottom. With such a configuration, the respective magnetic fluxes (in the direction of the optical axis) of each stage-moving permanent-magnet subunit and its respective dummy-magnet subunit cancel each other and hence produce a substantially zero-magnitude magnetic flux at the optical axis. As a result, even if the permanent-magnet subunit moves, the effect of its magnetic field in the movement direction on the CPB optical system is extremely small.

Yet another embodiment of a stage assembly comprises a stage as summarized above. The stage assembly also includes first and second moving-magnet linear motors operatively coupled to the stage for moving and positioning the stage in a movement direction in the X-Y plane. The linear motors are disposed in respective positions that are symmetric with respect to a plane that is parallel to the movement direction and that includes the optical axis. Each linear motor comprises: (1) a stage-moving permanent magnet split into a respective set of multiple magnet subunits and (2) a respective set of multiple corresponding dummy permanent-magnet subunits that are arranged and configured to move symmetrically with respect to a plane that is perpendicular to the movement direction and that includes the optical axis. The stage-moving magnet subunits of the first linear motor are arranged and configured to move symmetrically with the dummy-magnet subunits of the second linear motor, and the stage-moving magnet subunits of the second linear motor are arranged and configured to move symmetrically with the dummy-magnet subunits of the first linear motor, relative to the optical axis. The stage-moving magnet subunits of the first linear motor and the dummy-magnet subunits of the second linear motor, and the stage-moving magnet subunits of the second linear motor and the dummy-magnet subunits of the first linear motor are disposed anti-symmetrically with respect to the plane that is perpendicular to the movement direction and that includes the optical axis.

For example, in a rectangular coordinate system in which the optical axis is designated as the Z-axis, if the stage is moved in the Y-axis direction in the X-Y plane, the two linear motors are plane-symmetric relative to each other with respect to the Y-Z plane. In each linear motor, the permanent magnet that moves the stage is split into two or more magnet subunits. Also, corresponding dummy permanent magnets are provided that are plane-symmetric relative to the respective stage-moving permanent magnets with respect to the X-Z plane. As a result, the dummy permanent magnets move plane-symmetrically with respect to the X-Z plane.

Between the two linear motors, the permanent magnets are positioned such that each stage-moving permanent magnet moves by maintaining an axis-symmetrical position relative to the respective dummy permanent magnet for the other linear motor, with respect to the Z-axis.

The respective magnetic poles for the stage-moving permanent magnets and for the dummy permanent magnets are oriented anti-symmetrically with respect to the plane that is perpendicular to the movement direction and that includes the optical axis. Thus, regardless of the position of the stage, the magnetic fields in either direction on the optical axis are canceled and are substantially zero. As a result, even in instances in which MM-type linear motors are used, the effects of the magnetic fields produced by the permanent magnets on the CPB optical system are substantially eliminated.

The foregoing and additional features and advantages of the invention will be more readily apparent from the following detailed description, which proceeds with reference to the accompanying drawings.

DETAILED DESCRIPTION

Various aspects of the invention are set forth in the context of representative embodiments, which are not intended to be limiting in any way.

Figure 1A:
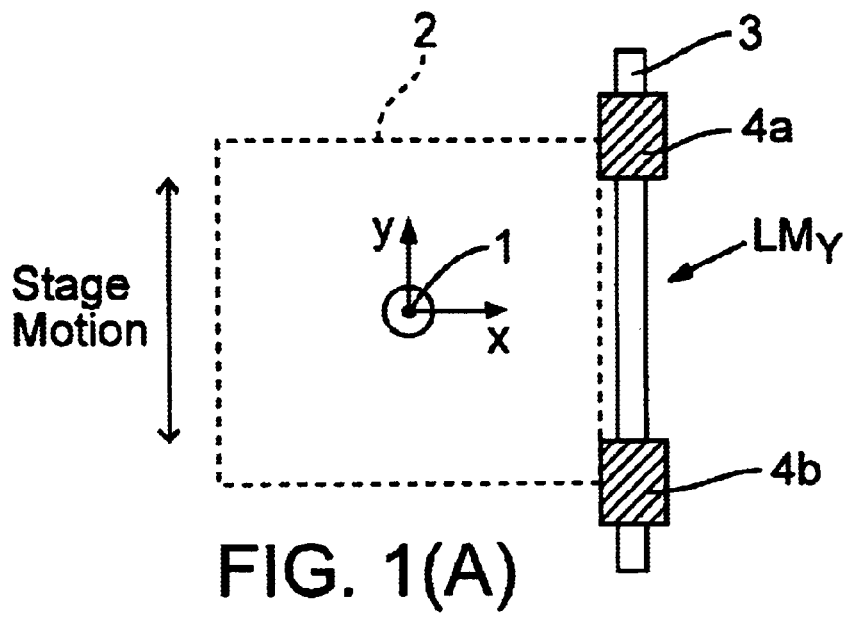
FIG. 1(A) is a plan view of a first representative embodiment of a stage and linear motor configuration according to the invention.
Figure 1B:
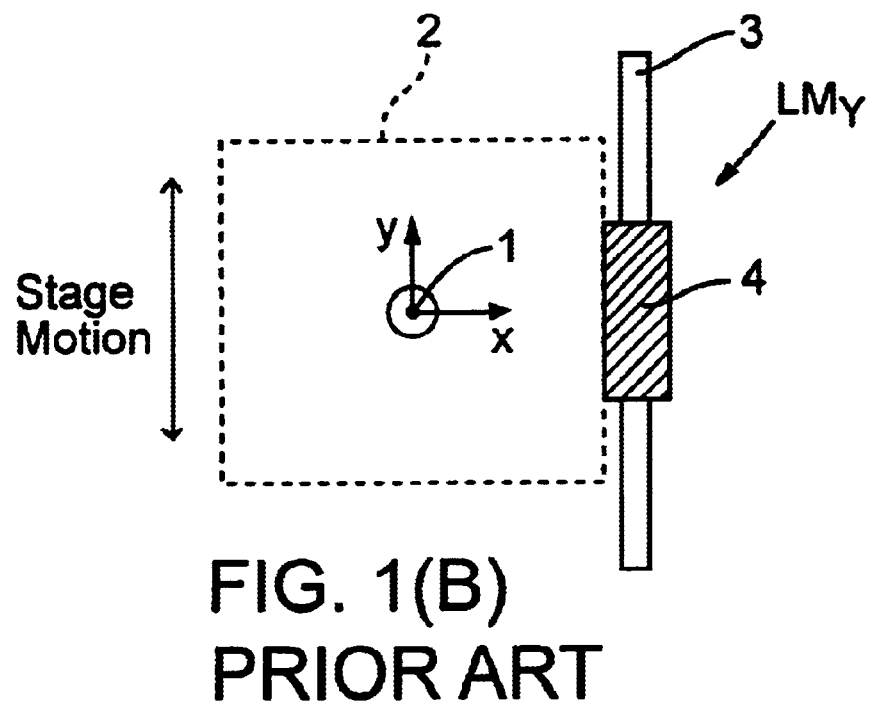
FIG. 1(B) is a plan view of a conventional configuration, as a comparison example.

A first representative embodiment is depicted in FIG. 1(A), and a comparison example (conventional configuration) is shown in FIG. 1(B). In each figure, an optical axis 1 extends perpendicularly to the plane of the page, wherein the plane of the page is denoted the X-Y plane. Hence, the optical axis 1 extends parallel to a Z-axis that is perpendicular to the X-Y plane.

In each of FIGS. 1(A) and 1(B), a stage 2 is situated in the X-Y plane, and is movable in the X-Y plane by respective linear motors (only one linear motor is shown). For example, in each figure, a linear motor $LM_Y$ is shown that performs movement of the stage 2 in the Y-axis direction. In FIG. 1(B) the linear motor $LM_Y$ includes a coil track 3 to which is engaged a single stage-moving permanent magnet 4. In FIG. 1(A) the linear motor $LM_Y$ includes a coil track 3 to which is engaged a stage-moving permanent magnet divided into two separate magnet subunits 4a, 4b.

In both of FIGS. 1(A) and 1(B), the coil track 3 is fixed, and the stage-moving permanent magnets move relative to the respective coil track 3. The magnets 4a and 4b in FIG. 1(A) and the magnet 4 in FIG. 1(B) are affixed to the respective stage 2. Thus, motion of the magnets 4a and 4b, 4 moves the respective stage 2.

As noted above, in FIG. 1(A), the stage-moving permanent magnet is split into two separate magnet subunits 4a, 4b. Each magnet subunit 4a, 4b is disposed farther away from the optical axis 1 than the single magnet 4 in FIG. 1(B). As a general rule, the strength of the magnetic field generated by a permanent magnet is inversely proportional to the square of the distance, from the permanent magnet, at which the strength of the field is measured. Hence, in the embodiment of FIG. 1(A) the magnet subunits 4a, 4b collectively produce a weaker magnetic field at the optical axis 1 than the single magnet 4 in FIG. 1(B).

Although the configurations of FIGS. 1(A) and 1(B) involve MM-type linear motors, it will be understood that the same principle of FIG. 1(A) can be applied to MC-type linear motors. In other words, by splitting a fixed and immobile permanent magnet of an MC-type linear motor into two magnet subunits in the same manner as shown generally in FIG. 1(A), and by installing the magnet subunits at respective positions more remote from the optical axis than conventionally, the magnetic field generated by the magnet subunits at the optical axis is weakened.

Figure 2:
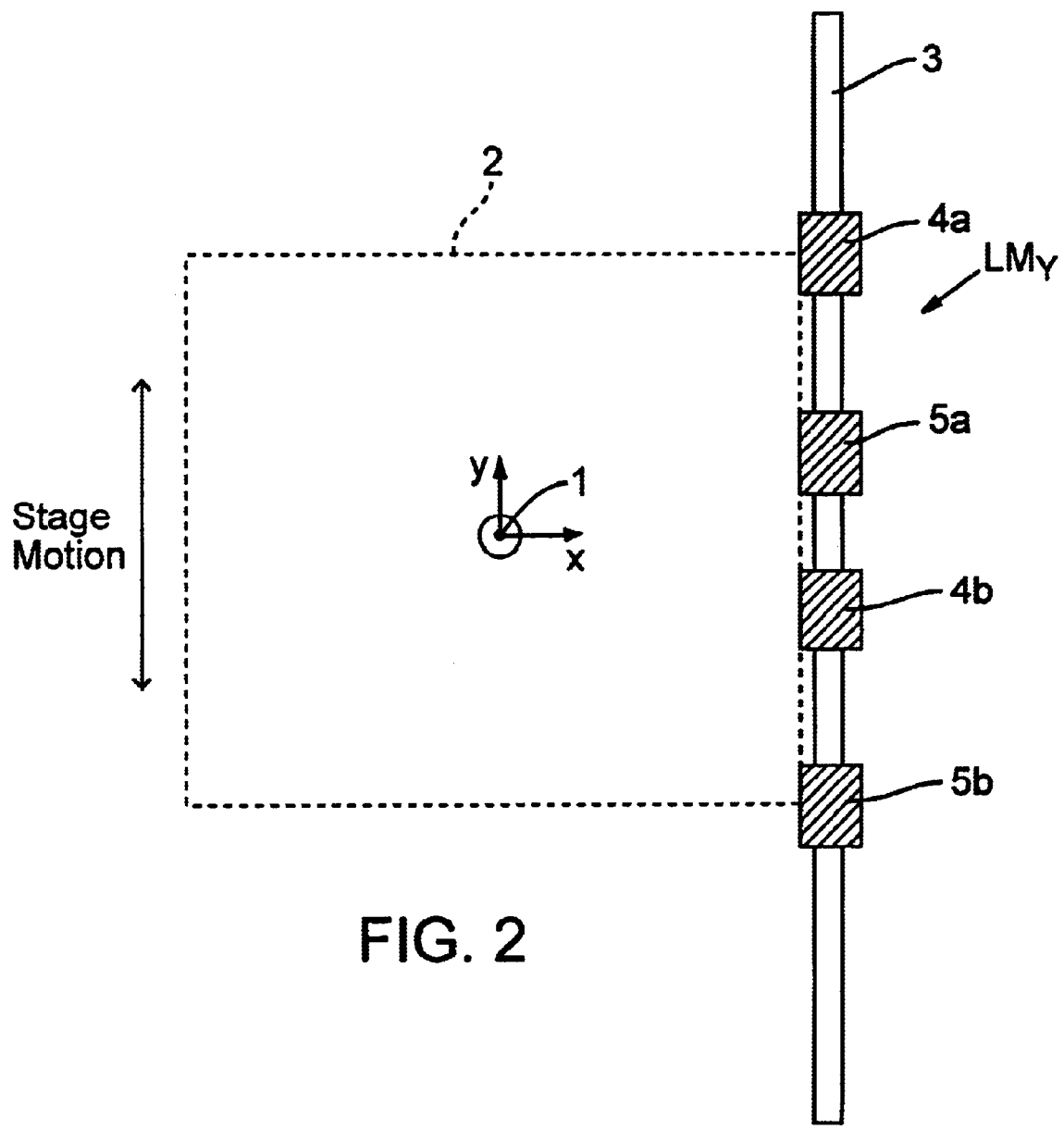
FIG. 2 is a plan view of a second representative embodiment of a stage and linear motor configuration.

A second representative embodiment is depicted in FIG. 2, in which constituent components that are identical to corresponding components shown in FIGS. 1(A) and 1(B) have the same reference numerals and are not described further. In FIG. 2, items 5a and 5b are respective "dummy" permanent-magnet subunits that are provided in addition to the stage-moving permanent-magnet subunits 4a and 4b. A "dummy" magnet is similar to a corresponding stage-moving magnet, but the dummy magnet does not cause the stage 2 to move. In FIG. 2, the Z-axis (parallel to the optical axis 1) passes, perpendicular to the plane of the page, through the center of the stage 2. Hence, the stage 2 is on an X-Y plane represented by the plane of the page. The stage 2 is movable in the Y-axis direction by a linear motor $LM_Y$ that includes the track 3 and the magnet subunits 4a and 4b. The configuration shown is a moving-magnet (MM) configuration.

The dummy-magnet subunits 5a, 5b need not be coupled to the stage 2. Nevertheless, the dummy-magnet subunit 5a desirably is coupled to the stage-moving magnet subunit 4b in a manner ensuring that the dummy-magnet subunit 5a remains in a position that is symmetrical to the stage-moving magnet subunit 4b, with respect to a X-Z plane. Consequently, respective magnetic fields from the stage-moving magnet subunit 4b and the opposing dummy-magnet subunit 5a collectively cancel each other and thus collectively produce a resultant zero-magnitude magnetic field at the optical axis 1. Similarly, the dummy-magnet subunit 5b is coupled to the stage-moving magnet subunit 4a in a manner ensuring that the dummy-magnet subunit 5b remains in a position that is symmetrical to the stage-moving magnet subunit 4a, with respect to a X-Z plane. Consequently, respective magnetic fields from the stage-moving magnet subunit 4a and the dummy-magnet subunit 5b collectively cancel each other and thus collectively produce a resultant zero-magnitude magnetic field on the optical axis 1.

Figure 3:
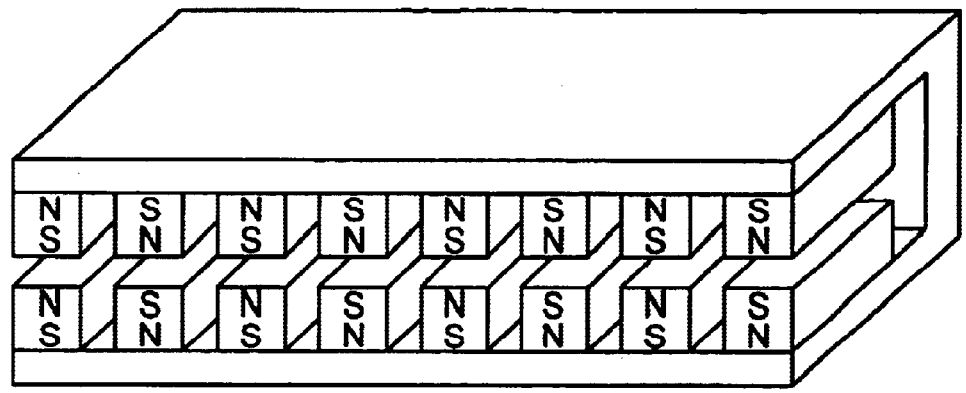
FIG. 3 is an oblique view showing a typical magnetic-pole array in a permanent magnet in a linear motor.

The direction of the magnetic fields that are canceled varies with the direction of the magnetic fields being generated at a given instant by the opposing stage-moving magnet subunit and dummy-magnet subunit. FIG. 3 shows an exemplary array of individual magnetic poles in a permanent-magnet subunit in the linear motor. Specifically, in the permanent-magnet subunit, magnetic fields emanating upward and downward are generated in alternately different directions.

Referring further to FIG. 2, if the respective magnetic fields generated by the magnet subunits are oriented in the Z-axis direction, and if the respective array of magnetic poles in each stage-moving magnet subunit 4a, 4b and in each dummy-magnet subunit 5a, 5b are symmetric with respect to the X-Z plane, then each magnetic field oriented in the Y-axis direction can be canceled in the X-Z plane. Similarly, by disposing the array of these magnetic poles anti-symmetrically with respect to the X-Z plane, it is possible to cancel the magnetic field in the direction of the optical axis 1 in the X-Z plane.

Also, in FIG. 2, if the respective magnetic fields generated by the magnet subunits are oriented in the X-axis direction, and if the respective array of magnetic poles in each stage-moving magnet subunit 4a, 4b and in each dummy-magnet subunit 5a, 5b that moves in correspondence with the corresponding stage-moving magnet subunits are symmetric with respect to the X-Z plane, then each magnetic field oriented in the Y-axis direction can be canceled in the X-Z plane. Similarly, by disposing the array of these magnetic poles anti-symmetrically with respect to the X-Z plane, it is possible to cancel the magnetic field in the direction of the optical axis in the X-Z plane.

Figure 4:
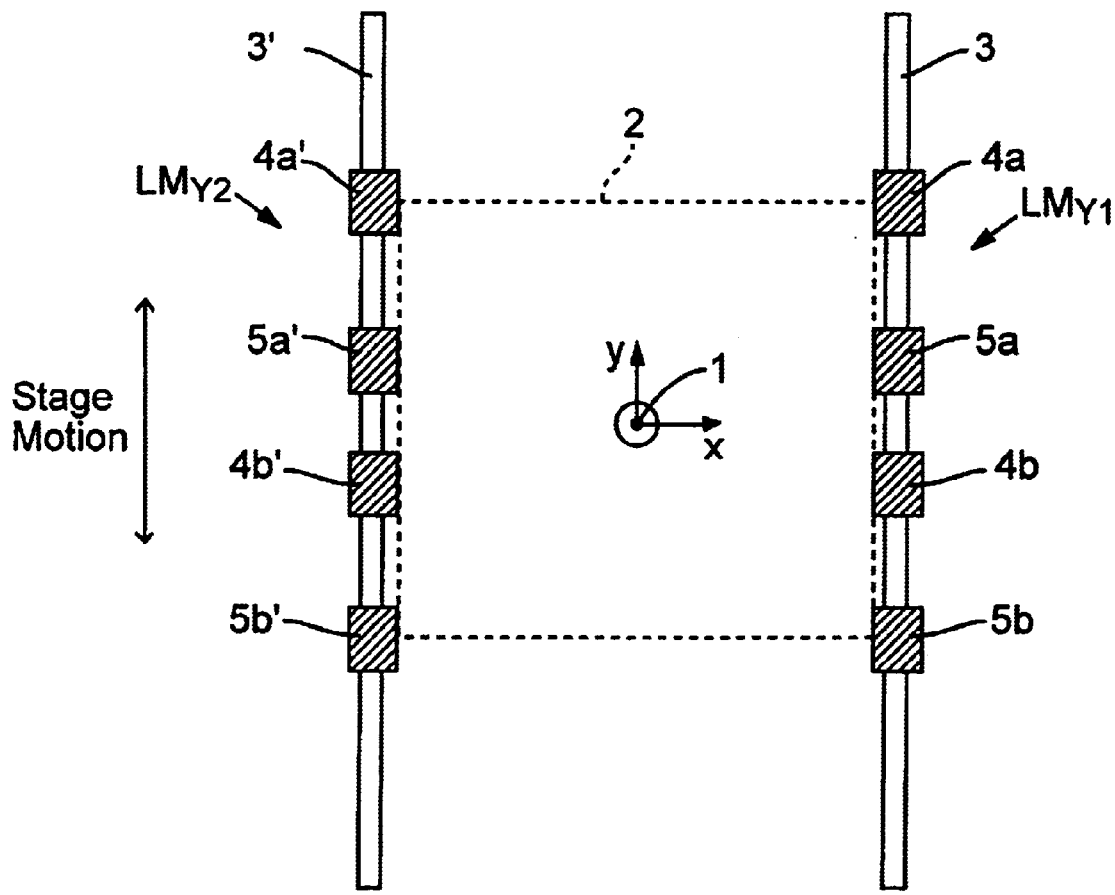
FIG. 4 is a plan view of a third representative embodiment of a stage and linear motor configuration.

A third representative embodiment is depicted in FIG. 4. In this figure, the optical axis 1 is parallel to the Z-axis, and the stage 2 is in the X-Y plane. In the figure, reference numerals including apostrophes (') correspond to respective components labeled with corresponding reference numerals lacking an apostrophe.

In this embodiment, the linear motor $LM_Y$ depicted in FIG. 2 is configured as two linear-motor portions $LM_{Y1}$, $LM_{Y2}$ arranged symmetrically with respect to the Y-Z plane. The stage-moving permanent-magnet subunit 4a and the dummy permanent-magnet subunit 5b', the stage-moving permanent-magnet subunit 4b and the dummy permanent-magnet subunit 5a', the stage-moving permanent-magnet subunit 4a' and the dummy permanent-magnet subunit 5b, and the stage-moving permanent-magnet subunit 4b' and the dummy permanent-magnet subunit 5a are moved in a coordinated manner so that they remain in positions that are symmetrical with respect to the optical axis 1.

Between each pair of magnet subunits consisting of a respective stage-moving magnet subunit and a respective dummy-magnet subunit 4a and 5b, 4b and 5a, 4a' and 5b', and 4b' and 5a', respectively, the respective magnetic-pole arrays are disposed anti-symmetrically with respect to the X-Z plane. In this manner, the magnetic fields in any of the X-Y-Z directions are always canceled, and they can be made virtually zero at the optical axis 1.

Figure 5:
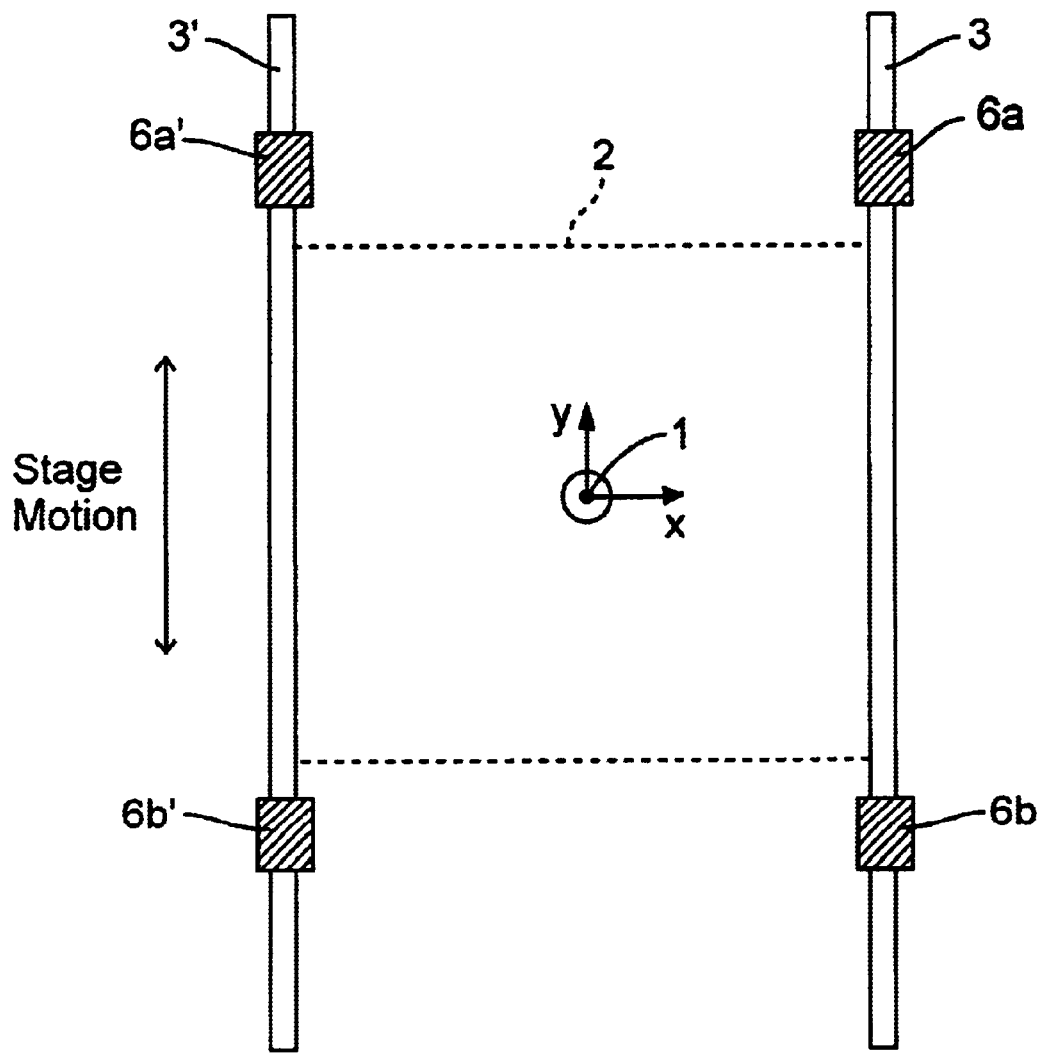
FIG. 5 is a plan view of a fourth representative embodiment of a stage and linear motor configuration.

A fourth representative embodiment is depicted in FIG. 5, in which items 6a, 6b, 6a', and 6b' are respective fixed permanent-magnet subunits. This embodiment uses an MC-type linear motor, in which the permanent-magnet subunits 6a and 6b, and 6a' and 6b' are fixed, and the respective coil tracks 3, 3' move relative to the respective magnet subunits. The stage 2, which is affixed to the coil tracks 3, 3', moves together with the coil tracks.

In FIG. 5, the optical axis is parallel to the Z-axis, and the plane containing the central axis for the coil tracks 3, 3' is designated as the X-Y plane. In other words, the axis of symmetry for the permanent-magnet subunits 6a, 6a', 6b, 6b' is also on the X-Y plane. The pairs of permanent-magnet subunits 6a and 6b', and 6b and 6a', including the placement of the respective magnetic poles, are disposed point-symmetrically with respect to the optical axis 1. In this manner, the magnetic fields generated by the respective pairs of permanent-magnet subunits 6a and 6b', and 6b and 6a', are mutually canceled at the optical axis 1. As a result, the magnetic fields on the optical axis 1 generated by the permanent-magnet subunits are substantially zero in any direction.

Figure 6:
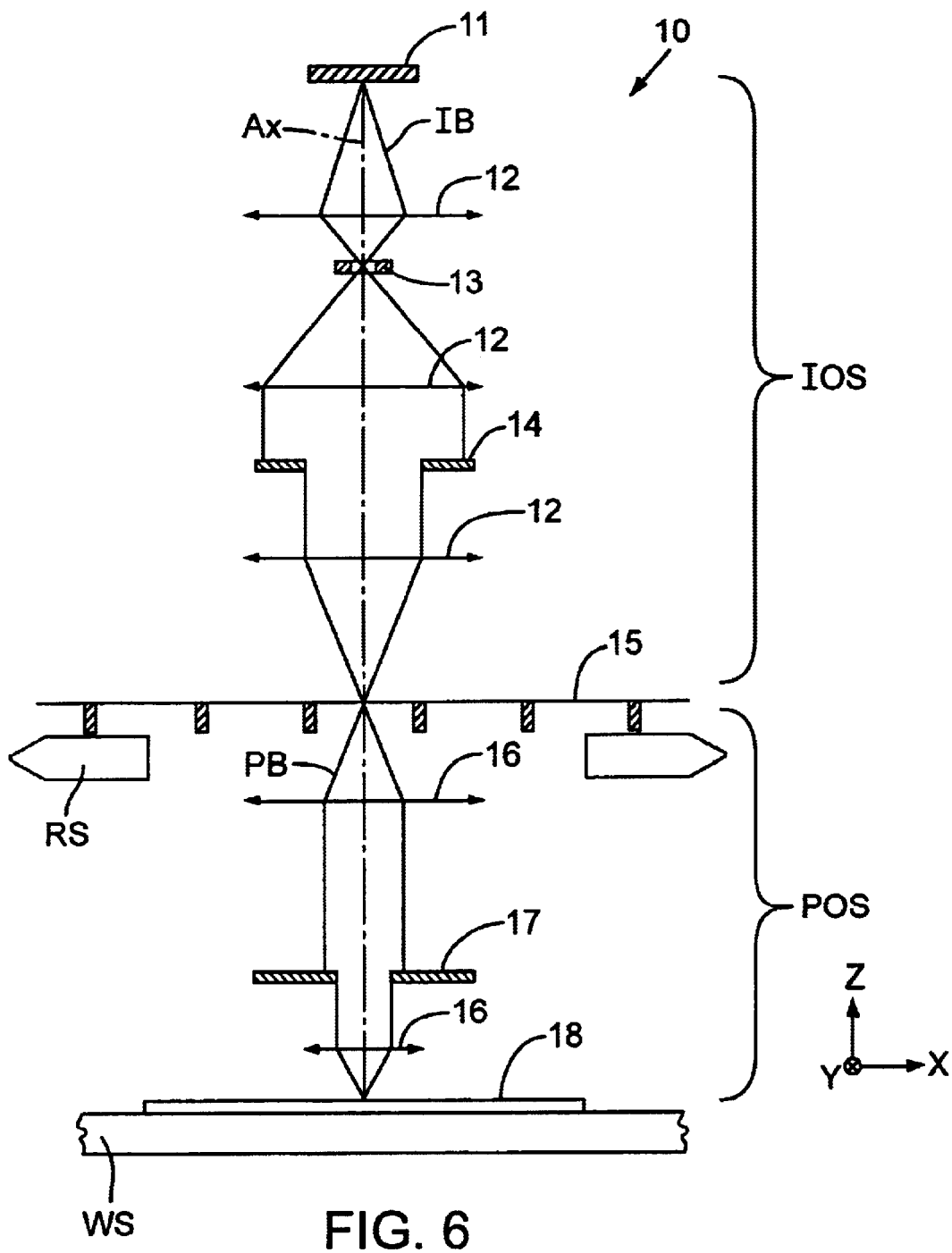
FIG. 6 is an elevational schematic diagram showing certain components and subsystems of a charged-particle-beam (CPB) exposure system including a stage and linear motor configuration according to the invention.

Certain aspects of a charged-particle-beam (CPB) microlithography apparatus 10 are depicted in FIG. 6. The depicted apparatus 10 utilizes an electron beam as the charged particle beam. The electron beam is produced by an electron-beam source 11 (i.e., "electron gun"). The electron beam from the source 11 propagates in a downstream direction (vertically downward in the figure) through an illumination-lens assembly 12, a beam-shaping aperture 13, and an aperture stop 14 to a reticle 15. The reticle 15 defines a pattern to be projection-transferred to a substrate 18 (e.g., semiconductor wafer having an upstream-facing surface coated with a suitable resist). The electron beam propagating from the source 11 to the reticle 15 is termed an "illumination beam" IB and the electron-optical components located between the source 11 and the reticle 15 collectively constitute an "illumination-optical system" IOS that extends along an optical axis Ax. From the reticle 15, the electron beam passes through a projection-lens assembly 16 and an aperture stop 17 to the substrate 18. The electron beam propagating from the reticle 15 to the substrate 18 is termed a "patterned beam" or "imaging beam" PB, and the electron-optical components situated between the reticle 15 and substrate 18 collectively constitute a "projection-optical system" POS that extends along the optical axis Ax. The illumination-optical system IOS and projection-optical system POS collectively are termed the "CPB-optical system."

The illumination beam IB is manipulated by the illumination-optical system IOS so as to illuminate a selected region on the reticle 15 in a uniform manner. An image of the illuminated region of the reticle 15 is formed on the substrate 18 by the projection-optical system POS. So as to be imprinted with the image, the upstream-facing surface of the substrate 18 is coated with a suitable resist. Such a substrate is termed "sensitive" to the patterned beam PB. The aperture stops 14, 17 function to block scattered electrons of the illumination beam IB and patterned beam PB, respectively. The aperture stops 14, 17 also trim the respective beams so as to limit the angular aperture of the respective beam. Situated at a location that is optically conjugate to the reticle 15 is the beam-shaping aperture 13, which limits the size and shape of the region on the reticle 15 that is illuminated by the illumination beam IB.

In the apparatus of FIG. 6, the reticle 15 is mounted on a reticle stage RS, and the substrate 18 is mounted on a wafer stage WS. Both stages RS, WS usually are independently movable at least in the X-axis and Y-axis directions. Desirably, movement of the stages in the X-axis and Y-axis directions is achieved by respective linear motors. Either or both the reticle stage RS and wafer stage WS comprises respective linear motors configured, for example, according to any of the embodiments described above. With such configurations, the magnetic fields generated by the permanent magnets in the linear motors that drive the respective stages are reduced in magnitude in the vicinity of the optical axis Ax, thereby reducing the impact of the magnetic fields on the CPB optical system. Reduced adverse effect of these magnetic fields at the optical axis yields improved exposure accuracy.

Figure 7:
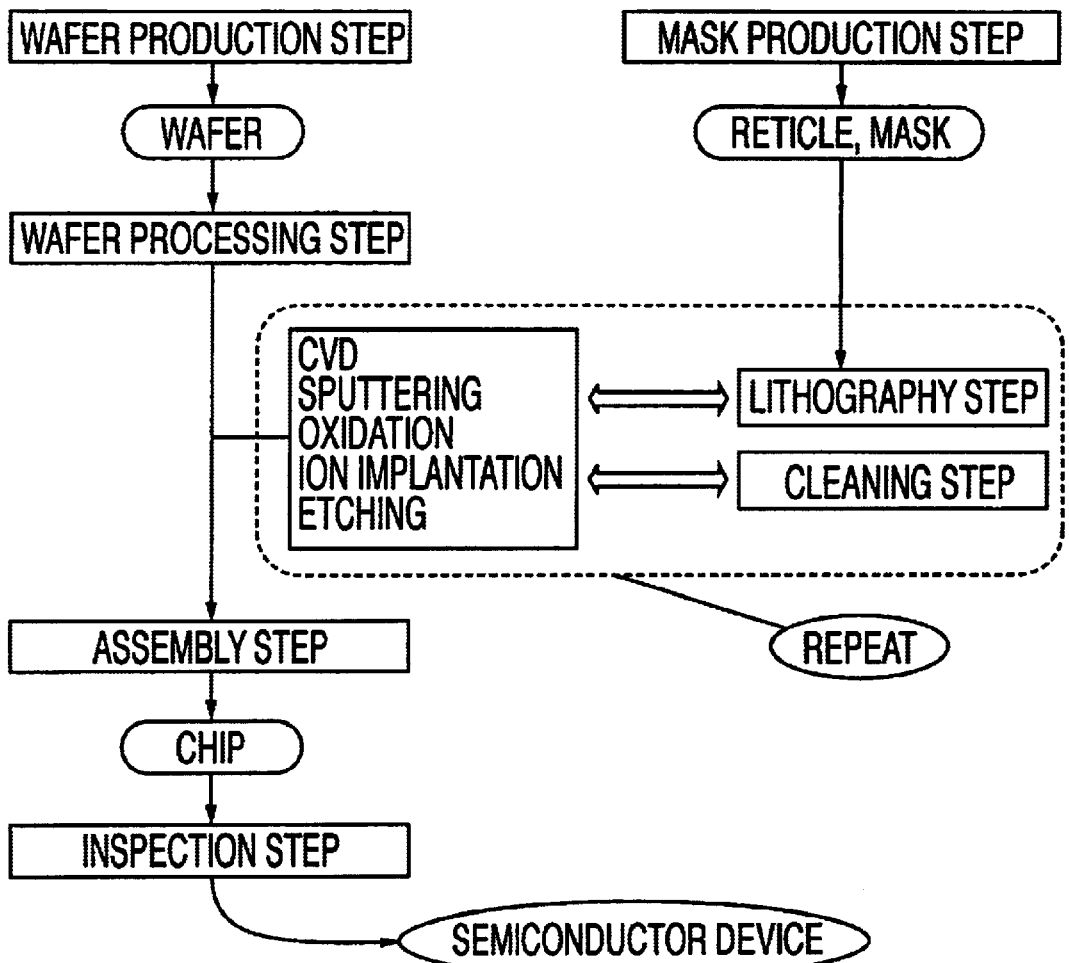
FIG. 7 is a flow chart of significant steps in a process for manufacturing a microelectronic device, the process including a lithography step performed using a CPB exposure system according to the invention.

FIG. 7 is a flowchart of an exemplary microelectronic-fabrication method in which apparatus and methods according to the invention can be applied readily. The fabrication method generally comprises the main steps of wafer production (wafer manufacturing or preparation), reticle (mask) production or preparation; wafer processing, device (chip) assembly (including dicing of chips and rendering the chips operational), and device (chip) inspection. Each step usually comprises several sub-steps.

Among the main steps, wafer processing is key to achieving the smallest feature sizes (critical dimensions) and best inter-layer registration. In the wafer-processing step, multiple circuit patterns are layered successively atop one another on the wafer, forming multiple chips destined to be memory chips or main processing units (MPUs), for example. The formation of each layer typically involves multiple sub-steps. Usually, many operative microelectronic devices are produced on each wafer.

Typical wafer-processing steps include: (1) thin-film formation (by, e.g., sputtering or CVD) involving formation of a dielectric layer for electrical insulation or a metal layer for connecting wires or electrodes; (2) oxidation step to oxidize the substrate or the thin-film layer previously formed; (3) microlithography to form a resist pattern for selective processing of the thin film or the substrate itself; (4) etching or analogous step (e.g., dry-etching) to etch the thin film or substrate according to the resist pattern; (5) doping as required to implant ions or impurities into the thin film or substrate according to the resist pattern; (6) resist stripping to remove the remaining resist from the wafer; and (7) wafer inspection. Wafer processing is repeated as required (typically many times) to fabricate the desired microelectronic devices on the wafer.

Figure 8:
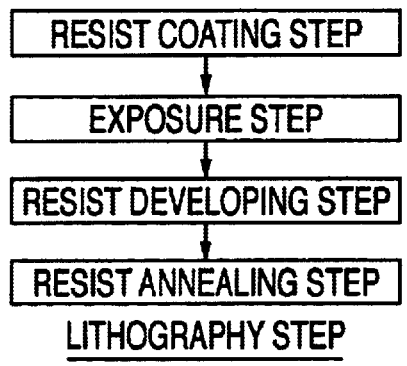
FIG. 8 is a flow chart detailing certain sub-steps in the lithography step of the process of FIG. 7.

FIG. 8 provides a flowchart of typical steps performed in lithography, which is a principal step in the wafer-processing step shown in FIG. 7. The lithography step typically includes: (1) resist-application step, wherein a suitable resist is coated on the wafer substrate (which an include a circuit element formed in a previous wafer-processing step); (2) exposure step, to expose the resist with the desired pattern by microlithography; (3) development step, to develop the exposed resist to produce the imprinted image; and (4) optional resist-annealing step, to enhance the durability of and stabilize the resist pattern.

The process steps summarized above are all well known and are not described further herein.

Whereas the invention has been described in connection with a representative embodiment, it will be understood that the invention is not limited to that embodiment. On the contrary, the invention is intended to encompass all modifications, alternatives, and equivalents as may be included within the spirit and scope of the invention, as defined by the appended claims.

What is claimed is:

1. A stage assembly for a charged-particle-beam (CPB) lithographic exposure system, comprising:

a stage configured for holding a reticle or substrate, the stage extending in an X-Y plane perpendicular to an optical axis that is parallel to a Z axis; and a linear motor operatively coupled to the stage and configured for moving the stage in the X-Y plane, the linear motor comprising a permanent magnet split into at least first and second permanent-magnet subunits arranged symmetrically with respect to a plane that is perpendicular to the X-Y plane, wherein the first and second permanent-magnet subunits produce respective first and second magnetic fields that cancel at least a portion of each other at the optical axis.

2. The stage assembly of claim 1, wherein the linear motor is a moving-coil type of linear motor.

3. The stage assembly of claim 1, wherein the linear motor is a moving-magnet type of linear motor.

4. A CPB exposure system, comprising a stage assembly as recited in claim 1.

5. A method for manufacturing a microelectronic device, comprising a lithography step performed using the CPB exposure system of claim 4.

6. A stage assembly for a CPB lithographic exposure system, comprising:

a stage extending in an X-Y plane perpendicular to an optical axis, the stage being configured for holding a reticle or substrate and for moving the reticle or substrate in a movement direction in the X-Y plane; and a moving-coil type linear motor operatively coupled to the stage, the linear motor comprising first and second linear-motor portions that are disposed in respective positions that are symmetric with respect to a plane including the optical axis and extending perpendicularly to the X-Y plane and parallel to the movement direction of the stage, each linear-motor portion comprising a respective permanent magnet split into multiple respective magnet subunits, wherein the magnet subunits of the first linear-motor portion are disposed relative to the magnet subunits of the second linear-motor portion in a point-symmetrical manner with respect to a point at which the X-Y plane intersects the optical axis.

7. A CPB exposure system, comprising a stage assembly as recited in claim 6.

8. A method for manufacturing a microelectronic device, comprising a lithography step performed using the CPB exposure system of claim 7.

9. A stage assembly for a CPB lithographic exposure system, comprising:
- a stage configured for holding a reticle or substrate, the stage extending in an X-Y plane perpendicular to an optical axis that is parallel to a Z axis; and
- a moving-magnet type of linear motor operatively coupled to the stage for moving and positioning the stage in a movement direction in the X-Y plane, the linear motor comprising multiple permanent-magnet subunits and multiple corresponding dummy permanent-magnet subunits, wherein the magnet subunits and the dummy-magnet subunits are arranged so as to move symmetrically with respect to a plane that is perpendicular to the movement direction and that includes the optical axis.

10. The stage assembly of claim 9, wherein:
- each of the permanent-magnet subunits and the dummy permanent-magnet subunits has respective magnetic poles; and
- the respective magnetic poles of the magnet subunits and of the dummy-magnet subunits are disposed symmetrically with respect to the plane that is perpendicular to the movement direction and that includes the optical axis.

11. The stage assembly of claim 9, wherein:
- each of the permanent-magnet subunits and the dummy permanent-magnet subunits has respective magnetic poles; and
- the respective magnetic poles of the magnet subunits and of the dummy-magnet subunits are disposed anti-symmetrically with respect to the plane that is perpendicular to the movement direction and that includes the optical axis.

12. A CPB exposure system, comprising a stage assembly as recited in claim 9.

13. A method for manufacturing a microelectronic device, comprising a lithography step performed using the CPB exposure system of claim 12.

14. A stage assembly for a CPB lithographic exposure system, comprising:
- a stage configured for holding a reticle or substrate, the stage extending in an X-Y plane perpendicular to an optical axis that is parallel to a Z axis; and
- first and second moving-magnet linear motors operatively coupled to the stage for moving and positioning the stage in a movement direction in the X-Y plane, the linear motors being disposed in respective positions that are symmetric with respect to a plane that is parallel to the movement direction and that includes the optical axis;
- each linear motor comprising (i) a stage-moving permanent magnet split into a respective set of multiple magnet subunits and (ii) a respective set of multiple corresponding dummy permanent-magnet subunits arranged and configured to move symmetrically with respect to a plane that is perpendicular to the movement direction and that includes the optical axis;
- the stage-moving magnet subunits of the first linear motor being arranged and configured to move symmetrically with the dummy-magnet subunits of the second linear motor, and the stage-moving magnet subunits of the second linear motor being arranged and configured to move symmetrically with the dummy-magnet subunits of the first linear motor, relative to the optical axis; and
- the stage-moving magnet subunits of the first linear motor and the dummy-magnet subunits of the second linear motor, and the stage-moving magnet subunits of the second linear motor and the dummy-magnet subunits of the first linear motor being disposed anti-symmetrically with respect to the plane that is perpendicular to the movement direction and that includes the optical axis.

15. A CPB exposure system, comprising a stage assembly as recited in claim 14.

16. A method for manufacturing a microelectronic device, comprising a lithography step performed using the CPB exposure system of claim 15.

17. In a method for performing lithographic exposure of a pattern onto a substrate using a charged particle beam passing through a charged-particle-beam (CPB) optical system of a CPB lithographic exposure apparatus that includes a stage extending in an X-Y plane and driven in an X-axis or Y-axis direction by a linear motor, a method for reducing the magnitude of a magnetic field produced by the linear motor at an optical axis of the CPB optical system, the optical axis being perpendicular to the X-Y plane, the method comprising:
- configuring the linear motor with multiple permanent-magnet subunits arranged symmetrically with respect to a plane that is perpendicular to the X-Y plane, wherein at least two magnetic fields produced by respective subunits cancel at least a portion of each other at the optical axis; and
- driving the stage in the X-axis or Y-axis direction using the linear motor.

18. In a method for performing lithographic exposure of a pattern onto a substrate using a charged particle beam passing through a charged-particle-beam (CPB) optical system of a CPB lithographic exposure apparatus that includes a stage extending in an X-Y plane and driven in an X-axis or Y-axis movement direction by a moving-coil linear motor, a method for reducing the magnitude of a magnetic field produced by the linear motor at an optical axis of the CPB optical system, the optical axis being perpendicular to the X-Y plane, the method comprising:
- configuring the linear motor with first and second linear-motor portions and disposing the first and second linear-motor portions in respective positions that are symmetric with respect to a plane including the optical axis and extending perpendicularly to the X-Y plane and parallel to the movement direction; and
- configuring each linear-motor portion with a respective permanent magnet split into multiple respective magnet subunits, and disposing the magnet subunits of the first linear-motor portion relative to the magnet subunits of the second linear-motor portion in a point-symmetrical manner with respect to a point at which the X-Y plane intersects the optical axis.

19. In a method for performing lithographic exposure of a pattern onto a substrate using a charged particle beam passing through a charged-particle-beam (CPB) optical system of a CPB lithographic exposure apparatus that includes a stage extending in an X-Y plane and driven in an X-axis or Y-axis movement direction by a moving-magnet linear motor, a method for reducing the magnitude of a magnetic field produced by the linear motor at an optical axis of the CPB optical system, the optical axis being perpendicular to the X-Y plane, the method comprising:
- configuring the linear motor with multiple permanent-magnet subunits and multiple corresponding dummy permanent-magnet subunits; and
- arranging the magnet subunits and the dummy-magnet subunits so as to move symmetrically with respect to a plane that is perpendicular to the movement direction and that includes the optical axis.

20. In a method for performing lithographic exposure of a pattern onto a substrate using a charged particle beam passing through a charged-particle-beam (CPB) optical system of a CPB lithographic exposure apparatus that includes a stage extending in an X-Y plane and driven in an X-axis or Y-axis movement direction by first and second respective moving-magnet linear motors, a method for reducing the magnitude of a magnetic field produced by the linear motors at an optical axis of the CPB optical system, the optical axis being perpendicular to the X-Y plane, the method comprising:

disposing the linear motors in respective positions that are symmetric with respect to a plane that is parallel to the movement direction and that includes the optical axis;

configuring each linear motor with (i) a stage-moving permanent magnet split into a respective set of multiple magnet subunits and (ii) a respective set of multiple corresponding dummy permanent-magnet subunits arranged and configured to move symmetrically with respect to a plane that is perpendicular to the movement direction and that includes the optical axis;

arranging the stage-moving magnet subunits of the first linear motor so as to move symmetrically with the dummy-magnet subunits of the second linear motor, and arranging the stage-moving magnet subunits of the second linear motor so as to move symmetrically with the dummy-magnet subunits of the first linear motor, relative to the optical axis; and disposing the stage-moving magnet subunits of the first linear motor and the dummy-magnet subunits of the second linear motor, and the stage-moving magnet subunits of the second linear motor and the dummy-magnet subunits of the first linear motor, anti-symmetrically with respect to the plane that is perpendicular to the movement direction and that includes the optical axis.

* * * * *

UNITED STATES PATENT AND TRADEMARK OFFICE
CERTIFICATE OF CORRECTION

PATENT NO.    : 6,713,900 B2
DATED         : March 30, 2004
INVENTOR(S)   : Yamada It is certified that error appears in the above-identified patent and that said Letters Patent is hereby corrected as shown below:

Column 2,
Lines 64-65, "subunits CPB" should read -- subunits on the CPB --.

Column 4,
Line 44, "dummy-magnet unit" should read -- dummy-magnet subunit --.

Column 10,
Line 2, "(which an include" should read -- (which can include --.

Signed and Sealed this

First Day of March, 2005

JON W. DUDAS
*Director of the United States Patent and Trademark Office*